M. L. SEVERY & G. B. SINCLAIR.
SYNCHRONIZER.
APPLICATION FILED MAR. 15, 1913.
1,224,420.
Patented May 1, 1917.
3 SHEETS—SHEET 2.
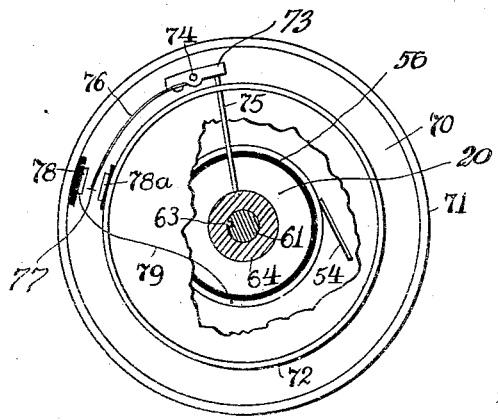
Fig. 5
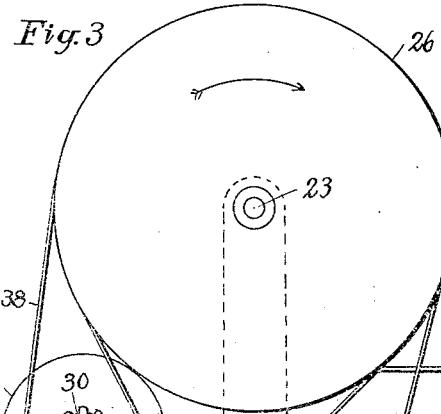
Fig. 3
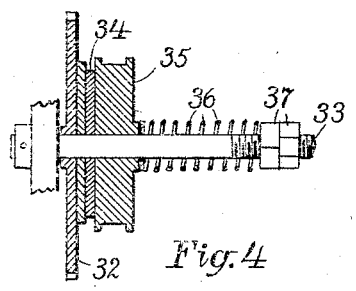
Fig. 4
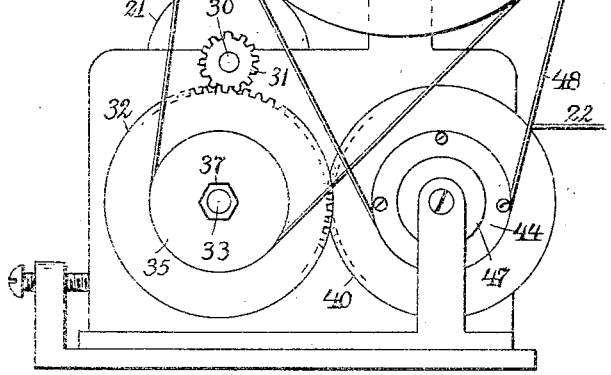
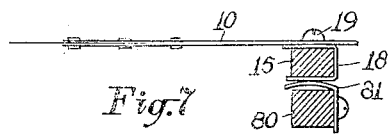
Fig. 7
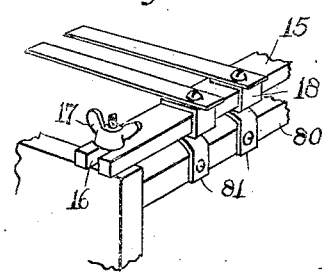
Fig. 6
Fig. 8
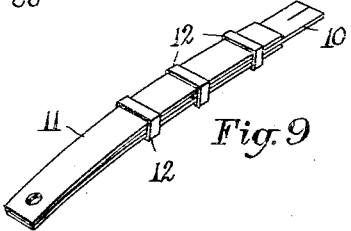
Fig. 9
Witnesses;
Inventors,
Melvin L. Severy,
George B. Sinclair;
By
Attorney.

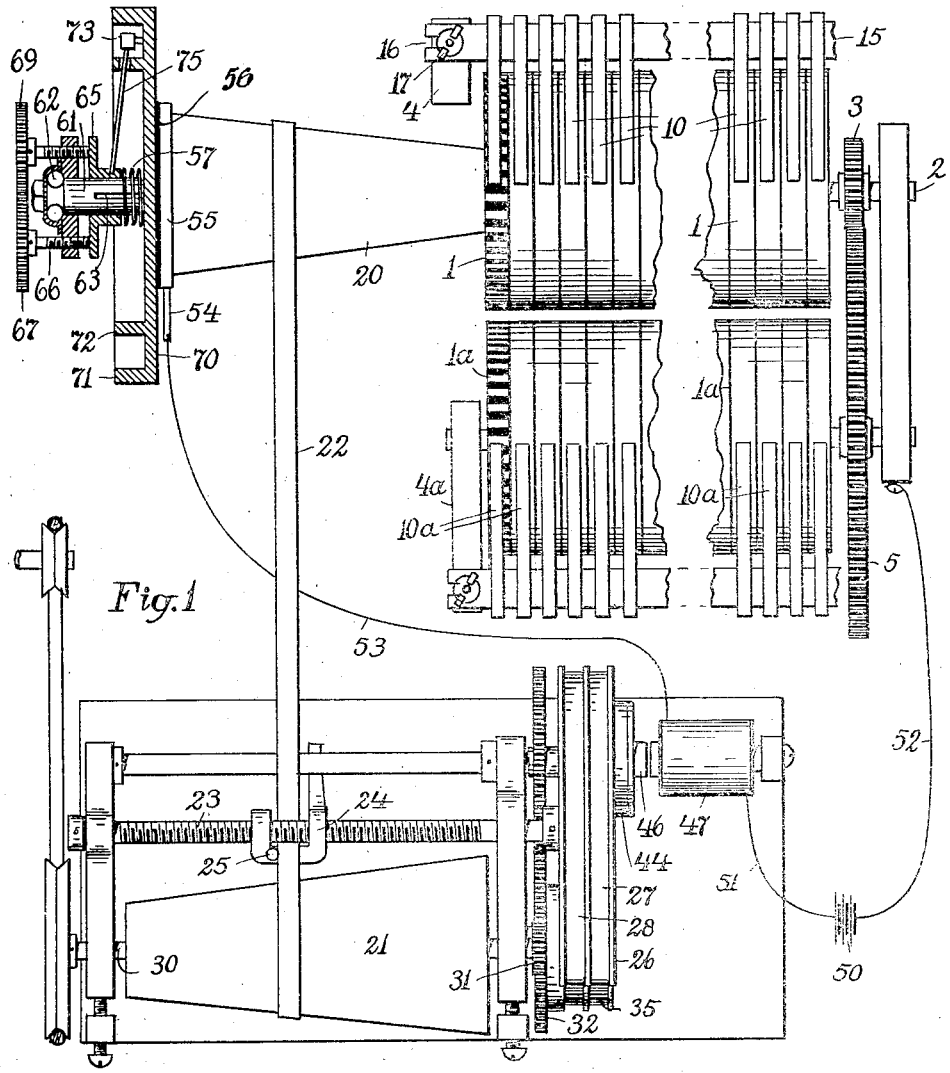

UNITED STATES PATENT OFFICE.

MELVIN L. SEVERY, OF ARLINGTON HEIGHTS, MASSACHUSETTS, AND GEORGE B. SINCLAIR, OF GEORGETOWN, MAINE, ASSIGNORS TO CHORALCELO COMPANY, OF BOSTON, MASSACHUSETTS, A CORPORATION OF MAINE.

SYNCHRONIZER.

1,224,420.  Specification of Letters Patent.  Patented May 1, 1917.

Application filed March 15, 1913. Serial No. 754,475.

*To all whom it may concern:*

Be it known that we, MELVIN L. SEVERY, of Arlington Heights, in the Commonwealth of Massachusetts, and GEORGE B. SINCLAIR, of Georgetown, in the county of Sagadahoc and State of Maine, both citizens of the United States, have invented certain new and useful Improvements in Synchronizers, of which the following is a full, clear, and exact description.

One of the most important features in connection with the construction of a successful musical instrument wherein the sonorous bodies are vibrated by magnetic pulsations, relates to a means for insuring sensibly perfect synchronism of the pulsations in the electromagnets with the vibrations of their associated sonorous bodies. In other words, a synchronizing means is needed which shall not permit the pulsations in the magnets to be appreciably faster or slower than the rates necessary for keeping them exactly in synchronism with the vibrations of the sonorous bodies associated with said magnets.

The object of this invention is the construction of a synchronizer primarily designed for this purpose, but also adapted for the control of other machinery requiring similarly accurate synchronization.

Figure 11:
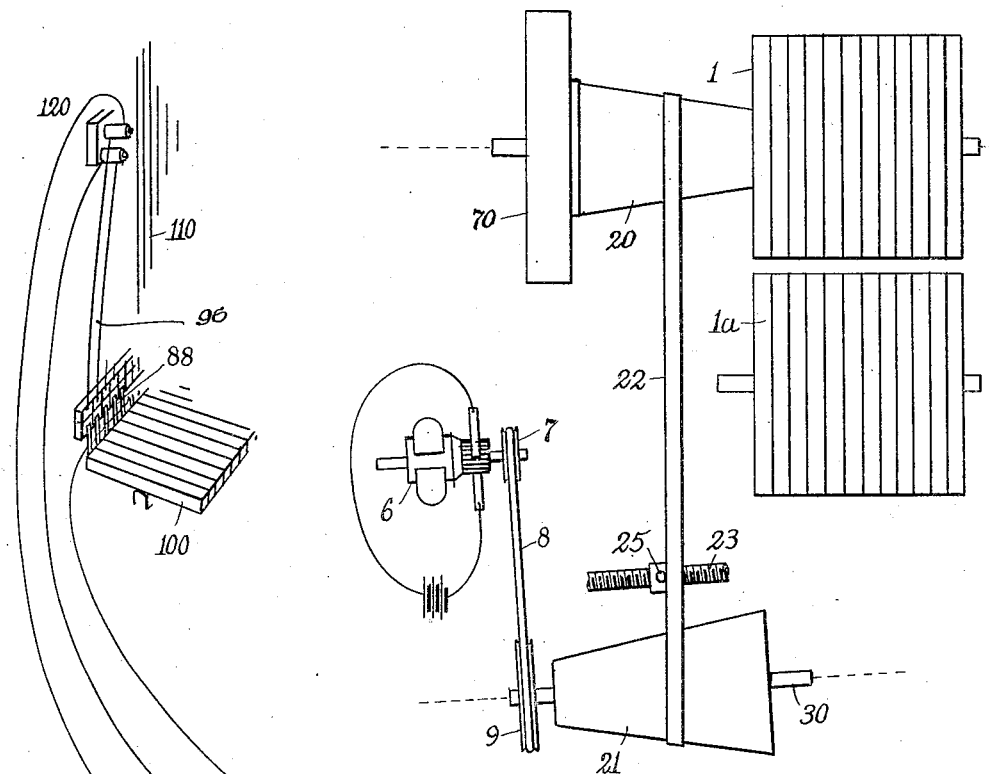
Figure 10:
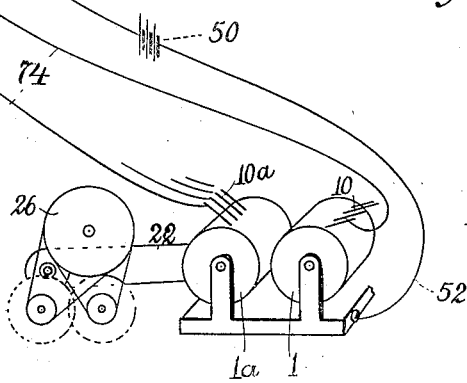

Referring to the drawings forming part of this specification, Figure 1 is a plan view, partially in section, of the synchronizing device complete, showing the same in control of a pulsator. Fig. 2 is a sectional elevation of the magnetic friction-applying device. Fig. 3 is an end elevation of a portion of the synchronizer. Fig. 4 is a sectional detail view of the permanent friction device. Fig. 5 is a detail elevation of the centrifugal contact wheel, showing the means whereby current is switched to the magnetic friction-applying device. Fig. 6 is a perspective view showing the pulsator brushes and the means for removing them from place. Fig. 7 is a cross-section of the latter. Fig. 8 is a side view of one of said brushes. Fig. 9 is a perspective view of one of said brushes. Fig. 10 is a diagram showing the synchronizer in control of an electrical musical instrument provided with strings. Fig. 11 is a diagram in plan, showing in an exaggerated manner the non-parallel or angular relationship between the two cones, and showing, also, a suitable source of motive power for driving the mechanism.

In Fig. 1, the reference numeral 1 designates a group of toothed disks connected by reducing gears 3, 5 to a similar group 1$^a$, and each disk having a brush 10 contacting therewith for taking the current-interruptions adapted for actuating the electric musical instrument for which this invention is especially designed. Rigid with the group of disks 1 is the cone 20 connected by a belt 22 to a similar but oppositely arranged cone 21. A guide-finger 25 carried by the traveler 24 serves to shift said belt and so vary the speed transmitted by the cone 21 to the cone 20.

The power by which the cone 21 is driven is designed to be ample for the maximum effort of the machine, and to be unaffected by the synchronizing device, the latter acting only to reduce the speed delivered to the disks 1, 1$^a$ when the speed of the power becomes too high, and to increase it when it becomes too low. Such power may be that produced by any suitable electric motor as 6 in Fig. 11, connected to the drum 30 by pulleys 7, 9 and belt 8.

The traveler 24 is mounted on the threaded rod 23 upon the outer end of which is fixed the drum 26. This drum has two belt-grooves 27, 28 one of which, 28, is connected to the pulley 35 by means of the belt 38; while in the other groove is a belt 48 from the pulley 44. Said pulleys are caused to rotate in opposite directions by the equal intermeshing gears 32, 40, and the latter are moved by the pinion 31 meshing with the gear 32 and fixed on the shaft 30 of said cone 21.

The gear 32 is mounted upon the spindle 33, together with said pulley 35; said pulley and gear being free to turn independently of each other except as influenced by the friction given by the spring 36 between them and the friction-disk 34 preferably composed of leather. The nut and check-nut 37 are adjusted on the threaded end of the spindle 33 until the friction is sufficient to cause the pulley 35 to turn the drum 26 and thereby move the belt-shifter or traveler 24. Hence the normal action of said pulley 35 is to shift the belt toward the larger end of the cone 21 and thereby accelerate the velocity of the disks 1, and this tendency of the pulley is constant but is at times counteracted or overcome as will be pointed out.

The other gear 40 is fixed upon its shaft 41, while the pulley 44 is freely mounted thereon. This pulley is chambered, inclosing a leather ring 43 fixed therein, and also inclosing the friction-disk 42 fixed on the end of the shaft 41. Fixed to the flanged edge of this pulley is a diaphragm 45 carrying the armature 46 which is located in the field of the fixed electromagnet 47. By magnetizing said magnet, said armature is drawn forward and the ring 43 brought into frictional contact with the disk 42, thereby causing the pulley to be rotated in unison with the gear 40.

To convey electricity to said magnet the instant the speed of the disks 1 begins to rise the slightest possible amount above the standard, the following arrangement has been devised. Fixed to the shaft 61 of the cone 20 is the double-flanged wheel 70, preferably made sufficiently heavy to serve as a fly-wheel and carrying the centrifugal-contact 77, which, when the said wheel increases slightly in speed, moves into touch with the contact-point 78 and so completes the circuit to said magnet. This centrifugal-contact is fixed to the end of the leaf-spring 76, and the latter is held by the block 73 pivoted to the wheel 70 between the flanges 71, 72 thereof. At the standard speed, this contact 77 will be held by centrifugal force almost in touch with the fixed contact 78; a slight accession of speed brings them in touch; and upon the cessation of rotation, the leaf-spring 76 bends inward against the flange 72. See Fig. 5.

To adjust this centrifugal contact 77, to allow for weakening in the spring 76, burning away of the contact 77, to change the speed of the machine, or for other purposes, the tail of the block 73 is joined by the slender rod 75 to the collar 64 slidable on said shaft 61. Said rod being arranged obliquely, as shown in Fig. 1, a movement of said collar toward the cone 20 increases the tension on the spring 76, and vice versa. A groove and spline 63 keeps said collar in angular position on said shaft; a coiled spring 57 presses in one direction said collar, while the latter is adjusted oppositely by the sleeve 65, and the adjusting screws 66, turned in unison by the intermeshing gears 67, 69.

A source of electricity 50 is connected to the magnet 47 by a wire 51 and to any metallic part of the machinery, as the bearing 2, by the wire 52. A lead-wire 53 joins said magnet to the brush 54 contacting with the conducting ring 55 which is joined by a suitable insulated wire 79 to the fixed contact 78 (Fig. 5). Said ring is supported by any suitable means, as the insulating ring 56 held by the cone 20, as shown in Fig. 1 and Fig. 5.

In actual practice we find this synchronizer exceedingly sensitive, the two pulleys 35 and 44 acting for a moment or so, first one and then the other, to shift the belt 22 back and forth on the two cones 20, 21, and so maintaining a practically constant speed.

In the construction of the brushes 10, we prefer to make each of copper held between two brass or steel strips 11 bound together by two or more lengths of adhesive tape 12, which also act to keep each brush from contacting with its neighbors. As each copper brush 10 wears away at its end, it can be drawn out a short distance from between its supporting brass strips 11. These brushes are secured by screws 19 to the wooden or non-conducting bar 15, with the clips 18 reaching from in contact with the brushes to the under side of said bar.

Beneath said bar 15 is a parallel bar 80 having a series of spring contacts 81 secured thereto directly beneath the clips 18. The bar 15 being held in position by any suitable locking device, as the thumb-nuts 17, can be at any time immediately removed together with the brushes secured thereto; and when replaced, the connection of each brush with the spring-contacts 81 is at once renewed, and thereby put into circuit with the source of electricity and the string-vibrating magnets of the electric musical instrument with which this synchronizer is used; the lead wires being designed for attachment to said contacts 81.

This synchronizer is especially designed for use in controlling the speed of the pulsators in the electric musical instrument set forth in our companion application Serial No. 273,199. In the diagram Fig. 10 is indicated a musical instrument of the same character. In this, the reference numeral 120 designates the electromagnets by means of which the strings 110 are vibrated; electric pulsations being transmitted to said magnets from the pulsators 1, 1$^a$ through the lead wires 74 and brushes 10, 10$^a$. The depression of the key 100 closes the circuit between said pulsators, source of electricity 50, the brushes rising from the inner ends of said keys, contacts 88 and wire 96, and so causes the particular string to be vibrated whose key 100 is depressed.

As set forth in our Patent No. 890,803, dated June 16, 1908, the strings are not vibrated with their maximum loudness and perfect quality except when they are tuned to be in exact accord with the number of pulsations given to their actuating magnets. It is equally true that if the pulsation producing mechanism rotates with a slightly too high or too low a speed, the quality and volume of music produced is markedly diminished.

Hence it is absolutely necessary to provide for the said mechanism a synchronizer which will not allow the same to vary in speed either above or below the standard to the slightest appreciable extent. This has never been done prior to our invention, and, in fact, we are unable to find that any earlier inventor has ever shown any way to control the speed of an electric musical instrument pulsator by means of a synchronizer or in any other practical way. Moreover, no type of speed regulator previously constructed for any purpose is capable of sufficiently close regulation to be used for pulsator control. The reasons are probably as follows:

Heretofore speed regulators have been merely governors and, it has been usual to effect a speed variation by altering the load of the mechanism to be varied by such governor; by varying the power supplied to said mechanism; by altering the power of the driving devices; or by altering the speed of the driving devices. Furthermore, such governors are so arranged that once they attain the speed for which they are set, the governing mechanism rests inoperative until the speed varies a considerable degree. Our invention is not a mere governor, it is a synchronizer and it belongs to a distinct type of speed regulation, in that the load of the driven device is not varied, and its speed would not be altered by such variation, up to the limit of power of the driving device. Neither do we vary the power or speed of the driving device. Our synchronizer is a dual mechanism one half of which is accelerative and the other half retardative, and one or the other half is always in operation. The theoretical speed required in our invention,—unlike that usually produced by mere governors,—is never constantly maintained by our device, nor maintained for any appreciable period, but is perpetually crossing this ideal theoretical point by an infinitesimal margin. Immediately one half of our mechanism brings the driven device just past the ideal speed, the other half becomes operative and throws it back an infinitesimal degree below; then the first tosses it up again; and so on; the average being the ideal speed and never varying appreciably in either direction.

We have found by extended experimentation that any devices of the governor class (or any devices of any nature which have been constructed by others and which have come to our notice) which theoretically cease to work when the ideal speed is reached, are in practice not anywhere near accurate enough for our needs; and that these can only be met by a mechanism which is perpetually, and with great rapidity, crossing the point of ideal speed by infinitesimal and practically negligible increments and decrements.

As already stated, the belt 22 is shifted upon the cones 20, 21 by the movement of the guide-finger 25. This finger is located at one edge only of said belt, and the belt kept in constant contact therewith by a slight obliquity between the two cones; the cone 21 being adjusted just enough out of parallel with the other to cause the constant but minimum possible pressure of contact. To obtain the exact degree of obliquity to preserve the contact but save friction, the standards of the cone 21 are made movable upon the base, and are each provided with adjusting screws, as shown in Figs. 1 and 3.

This obliquity of the cones is a very important matter, inasmuch as without it there would have to be two guide-fingers, one at each edge of the belt. Consequently, in order not to grip the belt too tightly between said fingers, there would be some lost motion as the traveler moved back and forth, this lost motion would greatly reduce quickness in shifting the belt, and ruin the best results of the mechanism.

It will be noted that the disks 1 being traversed by brushes 10 permit of the correct regulation of the duration of the attractive and non-attractive states of the electromagnets 120. This we have found to be of the utmost importance to good results. To secure a maximum of efficiency it will be evident that the current should be in the electromagnet 120 throughout the entire time of the approach of the string 110 toward said electromagnet, and that it should be cut out of magnet throughout the entire time of its recession from the electromagnet 120. It is this consideration which explains why the momentary taps of a rheotome are of so little avail in tone production.

When several rheotomes are used the difficulties multiply apace since it is manifestly impossible to make the "taps" of the various rheotomes of equal length so that not only is an extremely low efficiency the result, but this efficiency is not constant either at different times in the one rheotome or at any time in the various rheotomes taken in relation to each other. This means, of course, different degrees of loudness in a single sonorous body at different times and different degrees of loudness in juxtaposed or simultaneously sounded sonorous bodies at the same time, for one and the same amount of current, rendering fine musical expression and graduation out of the question.

In the case of our invention the synchronized rotating members 1 are provided with sections of high and low resistance so arranged that current is delivered to each of the magnets throughout substantially the whole of one vibrational phase of its associated sonorous body. This with the high perfection of synchronism which we obtain gives us a maximum of efficiency and a dependable constancy of loudness which makes possible the highest expressional results. Should a magnet "hold over" or attract its sonorous body for too long a period the quality of the tone is falsified so that great care has to be exercised to obtain the nicety of balance which secures efficiency without sacrificing purity of tone. Our current pulsators being mathematically figured and fixedly arranged attain this result perfectly.

It will be observed that no attempt is made to govern the speed of the motor 6, or to compensate for variations in the force actuating said motor, whether this be steam, water, electricity or other, but having provided a motor of power adequate to maintain at all times a sufficient speed of rotation of the rotor or pulsation-producing device, we control the turning of said rotor, keeping its speed practically constant, and such that the pulsations produced in the magnets shall have the same periodicities as the vibrations of the associated sonorous bodies when giving off their respective tones. In other words, each pulsation-producing member of the rotor is adapted when rotated at a predetermined speed, to produce pulsations in the magnet which it controls having the same frequency or periodicity as the vibrations of the sonorous body associated with its magnet, when such body is giving off its proper fundamental tone, and this predetermined speed of rotation is maintained by interposing between the rotor and the prime motor, the controlling device whereby the speed of rotation is maintained constant, and the pulsations in the respective magnets are synchronized with the vibrations or rates of vibration of the sonorous bodies which they actuate.

It is particularly to be noted that under the construction here set forth, the controlling element is a small and exceedingly light contact device carried by a delicate spring arm, the two jointly possessing but small mass and consequently negligible inertia, and developing only negligible momentum. As a consequence said element is capable of responding instantly to infinitesimal changes in the speed of the driven member to which it is applied. The movement of the contact member 77 involving as it does only a minute fluctuation of the spring member 76, there is no play or lost motion of connected parts to be taken up, as in the case of pin-jointed members. For these reasons such controlling element is exceedingly sensitive, and serves to bring into or cut out of play the clutching magnet 47, upon changes of speed so slight that they would not be detected or responded to by regulators involving the use of ball governors, sliding magnets, jointed and sliding contact makers, clutch members, and other relatively heavy moving bodies used as the initial or controlling element. This extreme lightness of the controlling element of our device is rendered possible by the fact that said element has no office to perform beyond moving through centrifugal force into contact with the contact block 78, and thereby closing an electric circuit. It exerts no appreciable pressure, imparts no motion, couples no parts, and does not act to transmit force or pressure except in the sense of affording a path for an electric current which through the magnet 47 brings into operation the parts which do perform the work. It will thus be seen that starting with the extremely sensitive initial element, and employing what may properly be termed a relay system, we bring into play ultimately sufficient power and devices of adequate strength to effect instantaneously the exceedingly minute adjustments of the driving belt necessary to compensate for the practically constant but minute fluctuations of speed of the driven member above and below the predetermined or ideal speed.

What we claim as our invention and for which we desire Letters Patent is as follows, to wit:—

1. In combination with a driving device and a mechanism driven thereby; electrically controlled means for regulating the speed of the driven mechanism, said means including a circuit closer for its energizing circuit consisting of a very light contact block carried by a resilient support mounted in or upon and movable with a rotating element of the driven mechanism, and a second contact insulated from the first and suitably secured to said rotating element of the driven mechanism.

2. The combination with a driving device and a mechanism driven thereby, of a speed-regulator for the driven mechanism comprising an accelerative and a retardative factor, one of which is constantly in operation during the operation of the driven mechanism; and an electric controlling mechanism for bringing into operation the other of said factors upon the occurrence of a predetermined speed change, said controlling mechanism including an electric circuit closer comprising a light contact member carried by a resilient arm mounted in or upon a rotating part of the driven mechanism, and a second contact also carried by said rotating part but insulated from the first contact.

3. The combination with a driving device and a mechanism driven thereby, of an electrically controlled speed-regulator for the driven mechanism, including a circuit closer consisting of a resilient member mounted in or upon a rotating part of the driven mechanism and having at its free end a contact member, and a second contact insulated from the first and also carried by said rotating part, the movable contact and its supporting arm being very light and hence capable of responding instantly to minute speed changes.

4. The combination with a driving device and a mechanism driven thereby, of a speed-regulator for the driven mechanism comprising a driving member, a driven member, and an intermediate connection for transmitting motion from the driving to the driven member; means tending normally so to adjust the intermediate member as to increase the speed of the driven member; and electrically controlled means brought into operation upon increase of speed of the driven member to adjust the intermediate member in a way to decrease the speed of said driven member.

5. The combination with a driving device and with mechanism driven thereby, of a speed-regulator for the driven mechanism, including a driving member, a driven member, and an intermediate device for transmitting motion from one to the other of said members; means acting constantly to adjust the transmitting device in a direction to accelerate the speed of the driven member; means acting intermittently to move the transmitting device in a direction to diminish the speed of the driven member; an electromagnet serving when energized, to bring the latter means into operation upon occurrence of a predetermined maximum speed; and a circuit closer directly carried by a rotative part of the driven mechanism, and positioned by centrifugal force generated therein, alternately to complete and to break the magnet circuit in accordance with increase and decrease in the speed of said rotating part.

6. The combination of a driving cone; a driven cone; a belt connecting said cones; a belt-shifter for said belt; a source of power; a frictional driving connection between said belt-shifter and source of power tending constantly to move said belt-shifter in one direction; means for overcoming said frictional driving connection and moving said belt-shifter in the opposite direction; and means for throwing the last-named device into the control of said source of power.

7. The combination of a driving cone; a driven cone; a belt joining the same; a belt-shifter for said belt; a source of power; frictional driving connections between said belt-shifter and source of power for moving said shifter in one direction; means for moving said belt-shifter in the opposite direction; a friction clutch for throwing the last-named means into connection with said source of power; an electromagnet for operating said clutch; a source of electricity; and a circuit closing device connected with said driven cone and controlling the current to said magnet.

8. In combination with a rotary driving member, a driven device and a power-transmitting member connecting the two; a shifter for moving said transmitting member to points on the driving member having differing superficial velocities; a wheel rotatable alternately in opposite directions and serving by such rotation to control the shifter; two oppositely turning wheels rotated by the driving member; means including an electromagnetic clutch, whereby either of the last-named wheels may be caused to turn the first-named wheel; and a centrifugal circuit closer carried by a rotating part of the driven device and serving through undue increase of speed and consequent outward movement, to complete the clutch circuit and cause the shifter-controlling wheel to be turned in a direction opposite to that in which it normally rotates.

9. The combination with a rotary driving member, a driven power-receiving device in contact therewith, and rotary means for shifting said power receiving device to points on said member of differing superficial velocities, of mechanism disposed to be revolved by said member and to transmit power in opposite directions to said rotary means, a friction clutch normally holding one of said mechanisms in the control of said rotating member, an electrically operated clutch for putting the other of said mechanisms into the control of said rotating member, and a centrifugally operated device for alternately switching the current to and from said electrically operated clutch.

10. The combination of a driving cone, a driven cone, a belt connecting the same, a belt-shifter, a screw shaft controlling said shifter, a pair of intermeshing gears positively driven, a drum on said screw shaft, a pulley loosely connected with each of said gears, a constant friction connection between one of said pulleys and its gear, a source of electricity, an electromagnet, a friction clutch operated by said magnet for connecting the other of said pulleys to its gear, and a circuit closing device controlling the current to said magnet.

In testimony that we claim the foregoing invention, we have hereunto set our hands this 17th day of December, 1913.

MELVIN L. SEVERY.
GEORGE B. SINCLAIR.

Witnesses:
EDWARD S. CROCKETT,
A. B. UPHAM.